United States Patent [19]
Takamiya et al.

[11] Patent Number: 5,557,407
[45] Date of Patent: Sep. 17, 1996

[54] MEASURING APPARATUS HAVING A DIFFRACTION GRATING FOR RECEIVING A DIVERGED LIGHT BEAM

[75] Inventors: Makoto Takamiya, Tokyo; Hidejiro Kadowaki, Yokohama, both of Japan

[73] Assignee: Canon Kabushiki Kaisha, Tokyo, Japan

[21] Appl. No.: 364,782

[22] Filed: Dec. 27, 1994

[30] Foreign Application Priority Data

Dec. 28, 1993 [JP] Japan ................................ 5-337465

[51] Int. Cl.⁶ .................................................. G01B 9/02
[52] U.S. Cl. ............................................ 356/356; 356/28.5
[58] Field of Search ........................... 356/28, 28.5, 356; 250/237 G

[56] References Cited

U.S. PATENT DOCUMENTS

| | | | |
|---|---|---|---|
| 5,216,478 | 6/1993 | Kadowaki et al. | 356/28.5 |
| 5,229,830 | 7/1993 | Ishida et al. | 356/356 |
| 5,256,885 | 10/1993 | Takamiya et al. | 356/28 |
| 5,272,512 | 12/1993 | Kadowaki et al. | 356/28 |
| 5,355,220 | 10/1994 | Kabayashi et al. | 356/356 |

FOREIGN PATENT DOCUMENTS 2262064  10/1990  Japan .
3235060  10/1991  Japan .

Primary Examiner—Samuel A. Turner
Assistant Examiner—Robert Kim
Attorney, Agent, or Firm—Fitzpatrick, Cella, Harper & Scinto

[57] ABSTRACT

A speed measuring apparatus includes a light source unit for generating a diverged light beam, a diffraction grating for generating diffracted light when the diverged light beam from the light source unit is made to enter the diffraction grating, an optical device for converting the diffracted light into a collimated light beam, and an optical detecting device for receiving interference light formed by projecting the collimated light on the object to be measured. The speed measuring apparatus measures the speed of the object by using signals corresponding to the frequency shift of the light obtained by the optical detecting device.

21 Claims, 18 Drawing Sheets

DEPENDENCE OF OSCILLATION WAVELENGTH ON CASE TEMPERATURE

MEASURING APPARATUS HAVING A DIFFRACTION GRATING FOR RECEIVING A DIVERGED LIGHT BEAM

BACKGROUND OF THE INVENTION

1. Field of the Invention

The present invention relates to a speed measuring apparatus for measuring the speed of a moving object or fluid and, more particularly, to a laser Doppler velocimeter for detecting speed by detecting the shift of the frequency of laser light.

2. Description of the Related Art

Hitherto, as an apparatus for measuring the moving speed of an object or fluid in a non-contact manner and with a high degree of accuracy, a laser Doppler velocimeter has been used. A laser Doppler velocimeter is an apparatus which projects laser light onto a moving object or fluid to measure the moving speed of the moving object or the moving fluid by using the effect such that the frequency of the light scattered by the moving object or the moving fluid shifts proportionally to the moving speed (the Doppler effect).

FIG. 1 is an illustration of an example of a conventional laser Doppler velocimeter.

In the figure, the laser light emitted from a laser 1 is made into a parallel beam 3 by a collimator lens 2, and divided into two light beams 5a and 5b by a beam splitter 4. After the two beams are reflected by mirrors 6 and 6', the light beams enter an object or fluid 7 moving at a speed V at an incidence angle θ. The light scattered by the object or fluid is detected by a photodetector 9 through a light-condensing lens 8. At this time, the frequency of the scattered light caused by the two light beams is subjected to Doppler shifts of $+\Delta f$ and $-\Delta f$, respectively, in proportion to the moving speed V. In this example, if the wavelength of the laser light is denoted as $\lambda$, $\Delta f$ can be expressed by the following equation (1):

$$\Delta f = V \sin\theta / \lambda \quad (1)$$

The scattered lights which are subjected to the Doppler shifts of $+\Delta f$ and $-\Delta f$ interfere each other, causing light and dark changes on the photosensitive surface of the photodetector 9, and the frequency F thereof (the beat frequency) is given by the following equation (2):

$$F = 2\Delta f = 2V\sin\theta \quad (2)$$

Therefore, if the frequency (hereinafter referred to as the Doppler frequency) of the output signals of the photodetector 9 is measured, it is possible to measure the speed V of the moving object or moving fluid (an object to be measured) on the basis of equation (2).

In such a laser Doppler speed meter as in the conventional example, as is clear from equation (2), the Doppler frequency F is inversely proportional to the wavelength $\lambda$ of the laser. Therefore, a laser light source in which the wavelength is stable must be used for a laser Doppler velocimeter. For a laser light source in which continuous oscillation is possible and the wavelength is stable, a gas laser using He-Ne or the like is well known. However, in such a laser, the laser oscillator is large, and high voltage is required for the power supply. Thus, the apparatus is large and expensive. Also, although laser diodes (semiconductor laser) used in compact discs, video discs, optical fiber communications or the like are ultra-small and can be driven easily, such laser diodes are dependent upon temperature, which is problematical.

FIG. 2 shows an example of the standard dependence of a laser diode upon temperature (cited from "'87 Mitsubishi Semiconductor Data Book: Photosemiconductor Elements"). The portion where the wavelength varies continuously is caused mainly by temperature-dependent changes of the reflective index of the active layer of the laser diode, which is from 0.05 to 0.06 nm/° C., while the portion where the wavelength varies non-continuously is called vertical mode hopping, which is from 0.2 to 0.3 nm/° C.

To stabilize the wavelength, generally, a method of controlling the laser diode at a constant temperature is used. In this method, temperature control members such as a heater, a radiator, or a temperature sensor, must be mounted in the laser diodes in such a way that only small heat resistance occurs, and the temperature must be controlled precisely. The laser Doppler velocimeter is relatively large, and the cost thereof is increased, and instability due to the above vertical mode hopping cannot be avoided completely.

As a laser Doppler velocimeter which solves the above-described problem, a method has been disclosed in Japanese Patent Laid-Open No. 2-262064 in which laser light serving as a light source is made to enter a diffraction grating, two diffraction lights of +n-th and -n-th (n: 1, 2, . . . ) order other than 0-th order are projected to a moving object or moving fluid at the same intersection angle as the angle formed by the two light beams, and the light scattered from the moving object or moving fluid is detected.

FIG. 3 shows an example in which laser light I is made to enter the transmission type diffraction grating 10 having a grating pitch d perpendicularly to the direction t in which the grating is orientated, and the diffraction angle θ0 is given by the following equation:

$$\sin\theta 0 = m\lambda/d$$

where m is the diffraction order (0, 1, 2, . . . ), and $\lambda$ is the wavelength of light.

Of these, ±nth-order light other than 0-th order is expressed by equation (3):

$$\sin\theta 0 = \pm n\lambda/d \quad (3)$$

where n is 1, 2, . . . .

FIG. 4 shows a case in which two light beams of ±nth-order light are projected onto an object 7 to be measured by the mirrors 6 and 6' disposed in parallel to each other so that the incidence angle becomes θ0. The Doppler frequency F detected by the photodetector 9 becomes as follows on the basis of equations (2) and (3):

$$F = 2V\sin\theta 0/\lambda = 2nV/d$$

(4)

Thus, the Doppler frequency F does not depend upon the wavelength X of the laser light I, and is inversely proportional to the wavelength $\lambda$ of the laser light I and proportional to the speed of the object 7 to be measured. Since the grating pitch d can be made to be sufficiently stable, the Doppler frequency F, which is proportional to the speed of the object 7 to be measured, can be obtained. The same applies if a reflection type diffraction grating is used for the diffraction grating 10.

Also, if light having high coherent characteristics, such as a laser, is projected onto an object, generally, the light is scattered by fine irregularities on the surface of the object and is subjected to random optical-wave phase modulation, and a spotted pattern, what is commonly called a speckle pattern, is formed on the observed surface. In the laser Doppler velocimeter, when an object to be measured moves, a change in light and dark due to the Doppler shift on the photosensitive surface of the photodetector is modulated into irregular light and dark signals by the flow of the speckle pattern, and also the output signals of the photosensor are modulated by the change in the reflectance of the object to be measured.

In the above laser Doppler velocimeter, since the frequency of the light and dark modulation by the flow of the speckle pattern and the frequency of the reflectance of the object to be measured are generally a low frequency in comparison with the Doppler frequency shown by the above equation (4), a method is used in which the low frequency components of the output signals are removed by a high pass filter, and only the Doppler signals are taken out. However, when the moving speed of the object to be measured is slow and the Doppler frequency is low, the difference between the low frequency and the Doppler frequency becomes small, the high pass filter cannot be used, and the moving speed of the object cannot be measured, which is problematical. The speed direction cannot be detected from a point of view of principles.

Accordingly, an apparatus for measuring at a low speed, shown in FIG. 5, is disclosed (Japanese Patent Laid-Open No. 3-235060). The diffraction grating 10 having a grating pitch d is disposed on the cylinder 11 and is rotated in the direction of the arrow at a peripheral speed Vg. When the laser light is made to enter a moving diffraction grating, the laser light is divided into ±nth-order diffraction lights 5 and 5', each of which receives positive and negative Doppler shifts ±nVg/d, respectively, and the diffraction angle θ0 satisfies the following:

$$\sin\theta 0 = nX/d \tag{5}$$

where λ is the wavelength of the light. When the two light beams of the ±nth-order light are projected onto the object 7 to be measured moving at a speed V by the mirrors 6 and 6' disposed in parallel to each other so that the incidence angle becomes θ0, of the light scattered from the object 7 to be measured, +n-th order light 5a receives a Doppler shift of n(Vg+V)/d, and -n-th order light 5a receives a Doppler shift of −n(Vg+V)/d, and interfere with each other. The Doppler frequency F becomes:

$$F = 2n(Vg+V)/d. \tag{6}$$

Thus, a Doppler frequency which is not dependent upon the wavelength of the laser light can be obtained. That is, even if the speed of the object 7 to be measured is slow, the frequency difference between the low frequency components arising from the change in light and dark modulation due to the flow of a speckle pattern or from the change in the reflectance of the object to be measured can be assumed sufficiently on the basis of the moving speed Vg of the diffraction grating. Removing the low frequency components of the output signals by a high pass filter and taking out only Doppler signals makes it possible to detect speed.

FIGS. 6 (a) and 6 (b) show the relationship between the speed V of the object to be measured and the Doppler frequency F in a laser Doppler velocimeter employing ±first-order diffracted light of the diffraction grating; FIG. 6(a) shows a case in which the diffraction grating is fixed; and FIG. 6 (b) shows a case in which the diffraction grating is moving at a speed Vg, where Fg=2Vg/d.

As can be seen in the figures, in FIG. 6 (a), even if a certain frequency F1 is detected, it is not possible to determine the direction of the movement because two speeds V1 and −V1, the directions of which are different, correspond to each other. On the other hand, in FIG. 6 (b), the Doppler frequency F=Fg+F1 can be obtained for speed V1, and the Doppler frequency F=Fg−F1 can be obtained for speed −V1, and the direction of the speed can also be detected.

That is, if the moving speed Vg of the diffraction grating is made constant, the following relation is satisfied on the basis of equation (6):

$$V = Fd/2 - Vg \tag{7}$$

Thus, it is possible to measure the speed V by detecting the Doppler frequency F.

In the construction shown in FIG. 4, it is necessary that the light beam before entering the diffraction grating be a collimated light beam in order to form the construction in which the collimated light beam is projected onto the object to be measured. In the apparatus of FIG. 4, when the grating pitch of the diffraction grating 10 is determined, the interval of the interference fringes formed by this grating is fixed.

In the construction of FIG. 6, a diffraction grating is disposed on the cylinder. Various methods of manufacturing the diffraction grating, and the materials therefor may be conceivable. When the diffraction grating is to be formed at a lower price, a plastic material formed by resin molding is preferable. However, since a plastic material has a very large thermal expansion, the grating pitch d of the diffraction grating on the cylinder varies with temperature. That is, since the grating pitch d handled as the constant in equation (7) varies, even if the Doppler frequency F is detected, it becomes difficult to accurately measure the speed V.

SUMMARY OF THE INVENTION

It is an object of the present invention to provide a speed measuring apparatus in which a light beam before entering a diffraction grating is not collimated but an optical system projects a collimated light beam on an object to be measured and eliminates the dependence upon wavelength.

It is another object of the present invention to provide a speed measuring apparatus which is capable of varying the interval of interference fringes as desired without replacing a diffraction grating as an optical system which eliminates the dependence upon wavelength.

It is still another object of the present invention to provide a speed measuring apparatus in which the dependence upon wavelength is eliminated and which operates for a slow speed, and in which the influence of the change in the grating pitch arising from thermal expansion or the like is eliminated.

In accordance with one aspect of the invention, a speed measuring apparatus comprises a light source unit for generating a diverged light beam, a diffraction grating for generating exit light, having at least two exit light beams and including diffracted light, when the diverged light beam from the light source unit enters the diffraction grating, and optical means for converting the exit light into a collimated light. In addition, optical detecting means receives interference light formed by projecting the collimated light on an object to be measured, wherein the speed of the object is measured by using signals obtained by the optical detecting means.

Another aspect of the invention relates to an optical apparatus for projecting a light beam onto an object to be measured and for obtaining interference light to be detected from the position at which the light beam is projected. The apparatus comprises a light source unit for generating a diverged light beam, a diffraction grating for generating exit light, having at least two exit light beams and including diffracted light, when the diverged light beam from the light source unit enters the diffraction grating, and optical means for converting the exit light into a collimated light. Optical detecting means receives interference light formed by projecting the collimated light onto the object to be measured.

In accordance with yet another aspect of the invention, an optical apparatus for forming interference fringes comprises a light source unit for generating a diverged light beam, a diffraction grating for generating exit light having at least two exit light beams when the diverged light beam from the light source enters the diffraction grating, and optical means for converting the exit light into a collimated light. The interference fringes are formed by the intersection of the light beams which are made into a collimated light beam by the optical means.

The above and further objects, aspects and novel features of the invention will more fully appear from the following detailed description when read in connection with the accompanying drawings. It is to be expressly understood, however, that the drawings are for the purpose of illustration only and are not intended to limit the invention.

DESCRIPTION OF THE PREFERRED EMBODIMENTS

Before embodiments of the present invention are explained, the principles of the present invention will be explained below.

Figure 1:
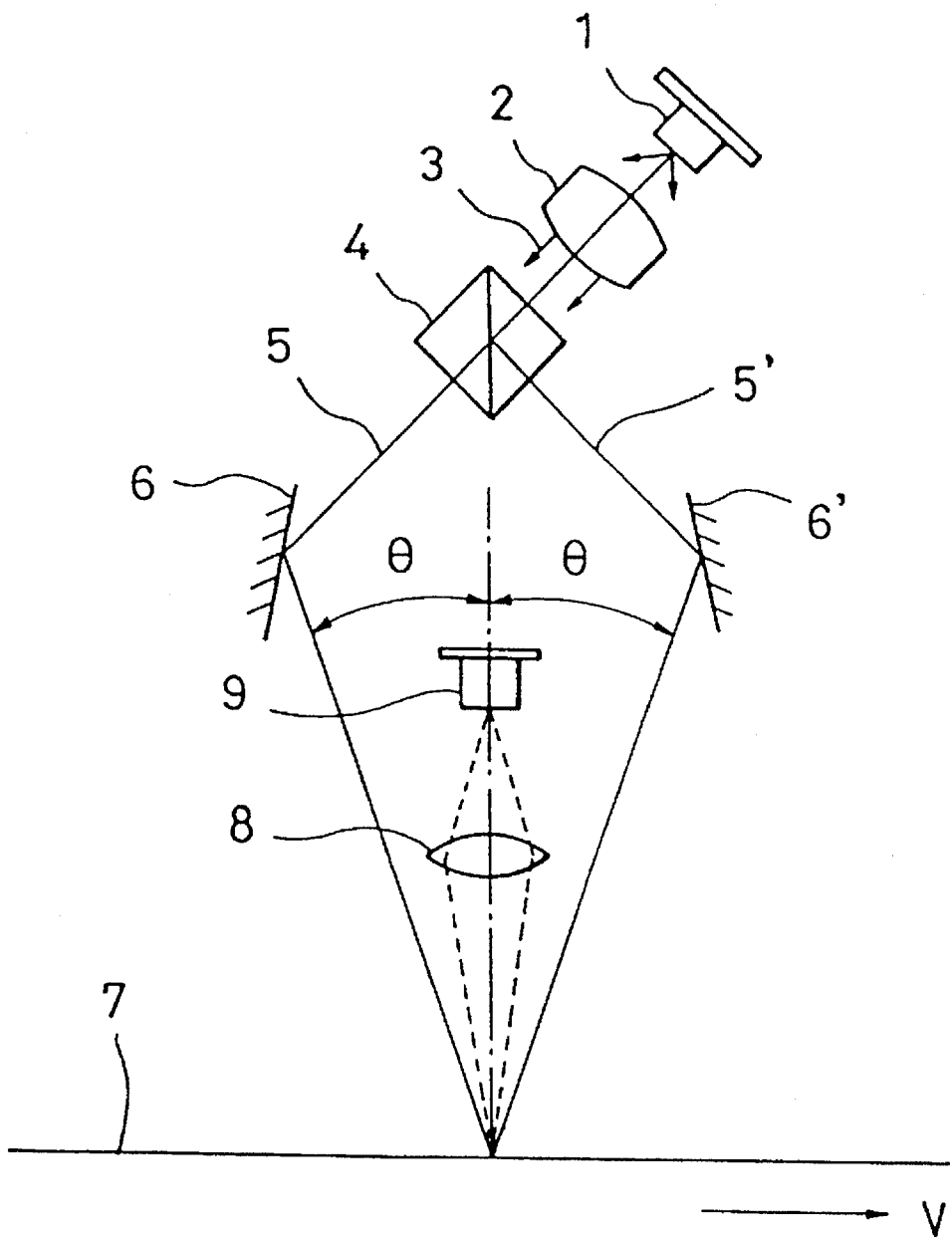
FIG. 1 is an illustration of an example of a conventional laser Doppler velocimeter.
Figure 2:
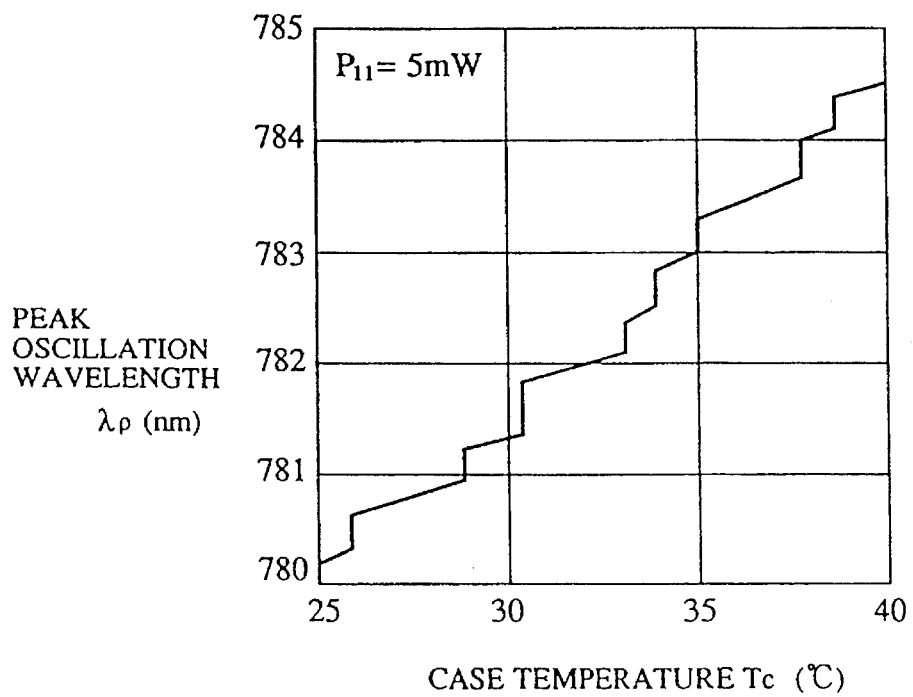
FIG. 2 shows an example of the dependence of the oscillation wavelength of a laser diode upon temperature.
Figure 3:
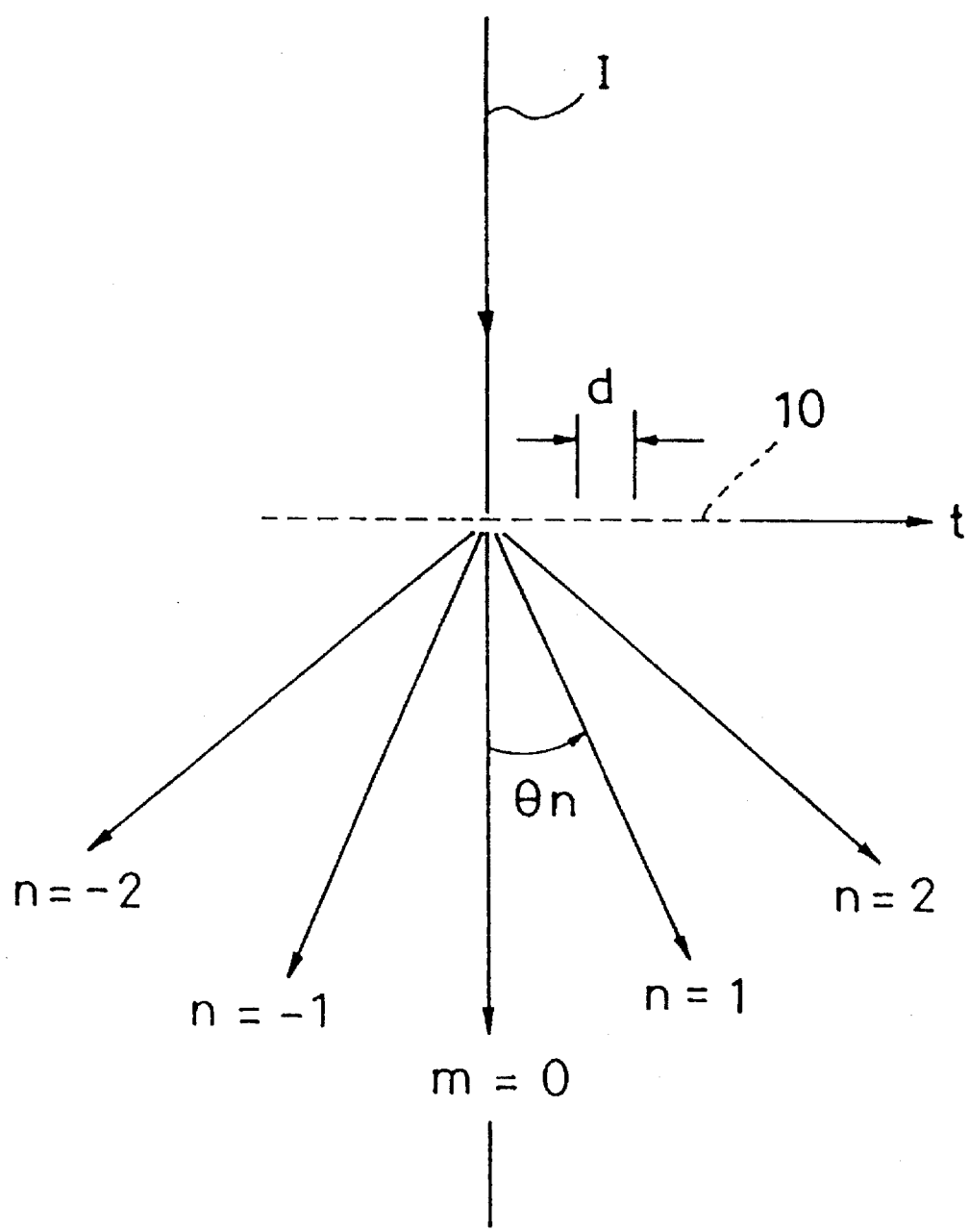
FIG. 3 is an illustration of a diffraction grating.
Figure 4:
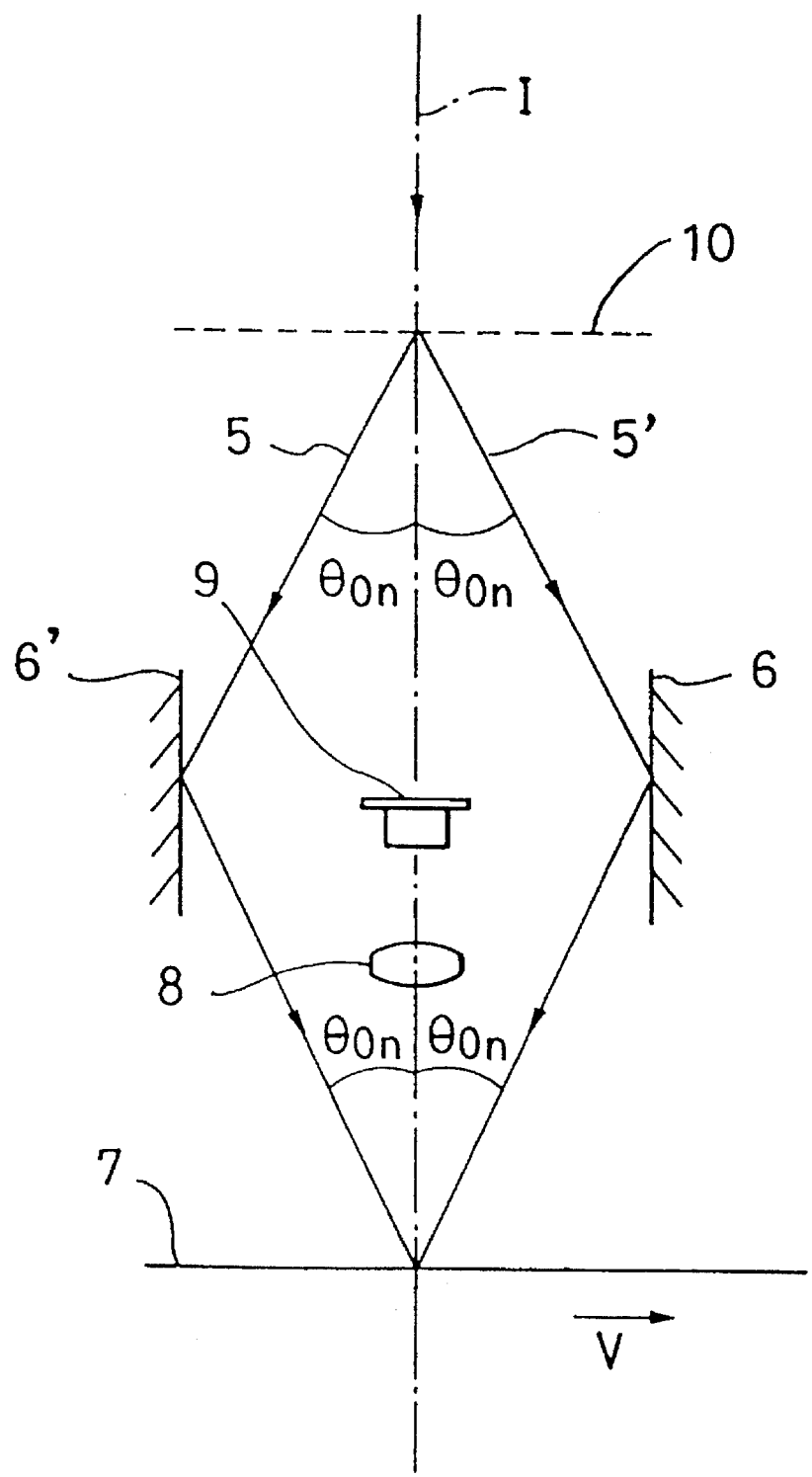
FIG. 4 is an illustration of a laser Doppler velocimeter employing a diffraction grating.
Figure 5:
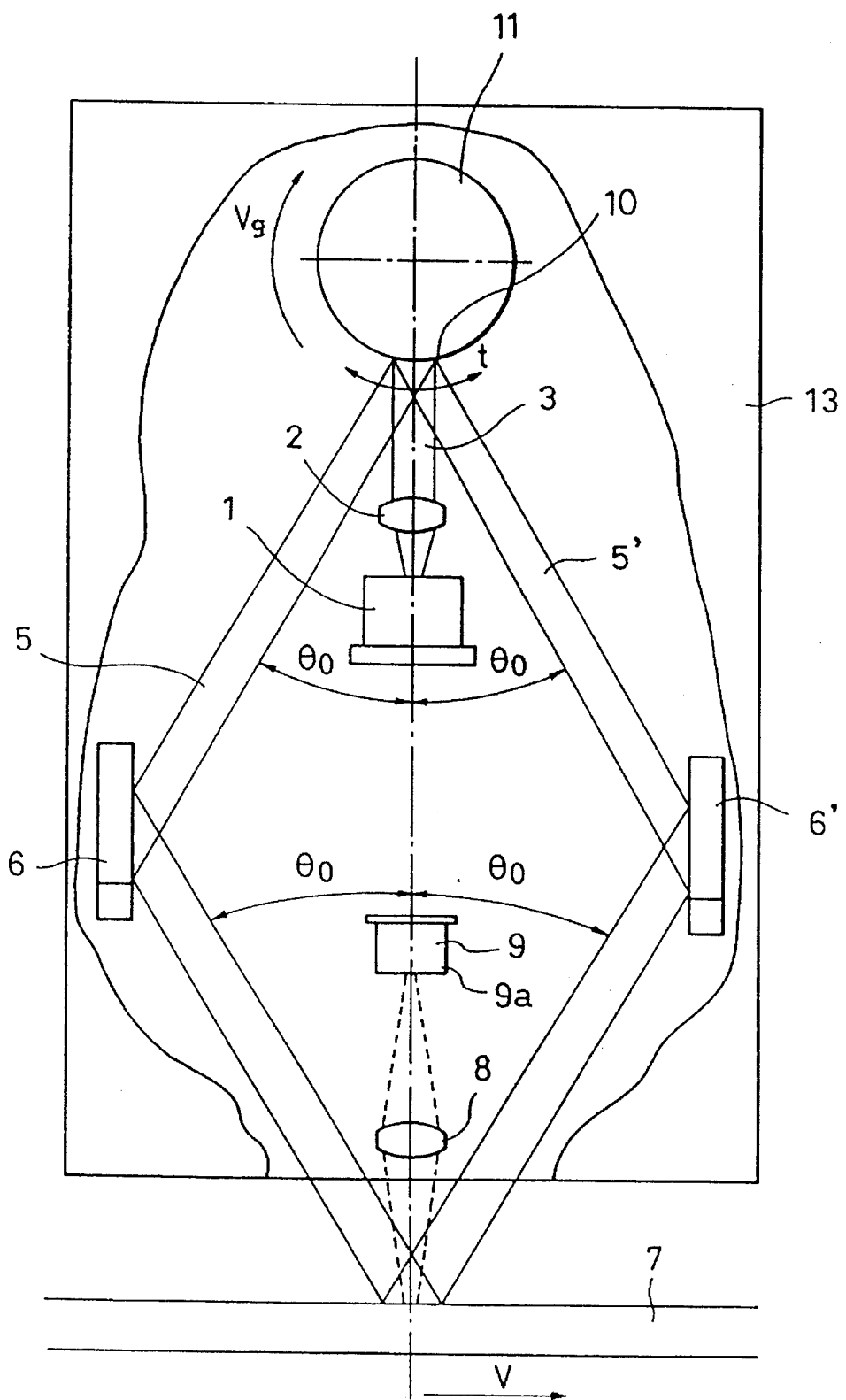
FIG. 5 is an illustration of another conventional example of a laser Doppler velocimeter.
Figure 6B:
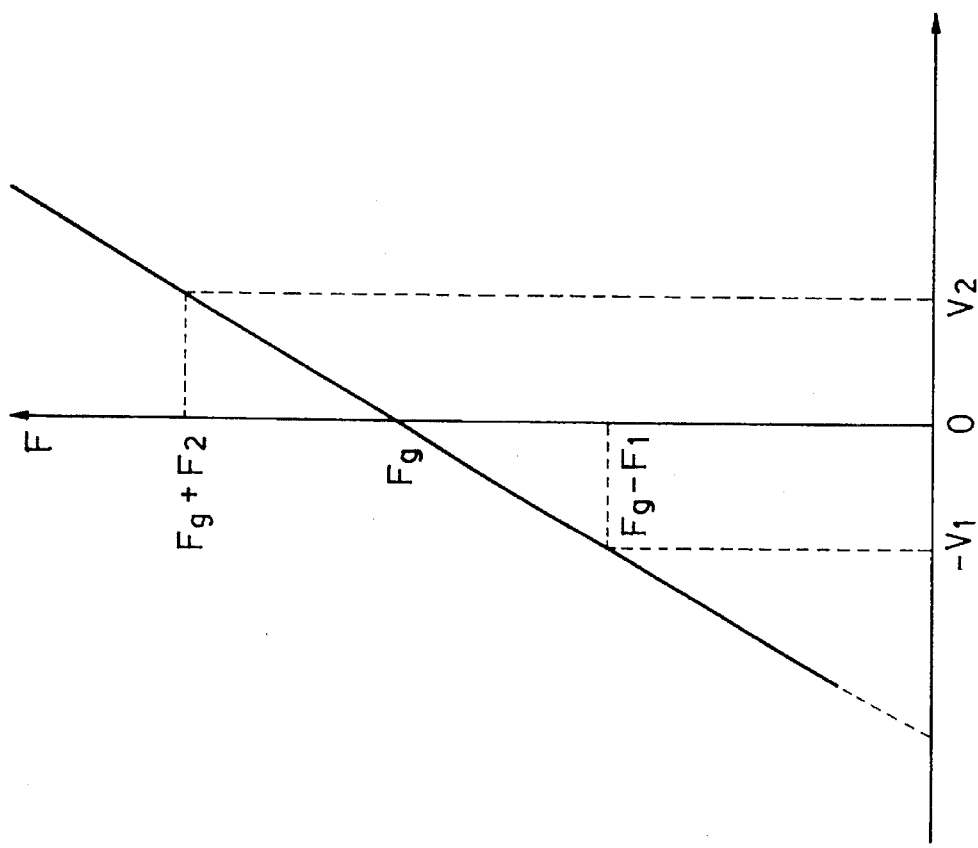
FIGS. 6 (a) and 6 (b) show the relationship between the speed V of an object to be measured and the Doppler frequency.
Figure 6A:
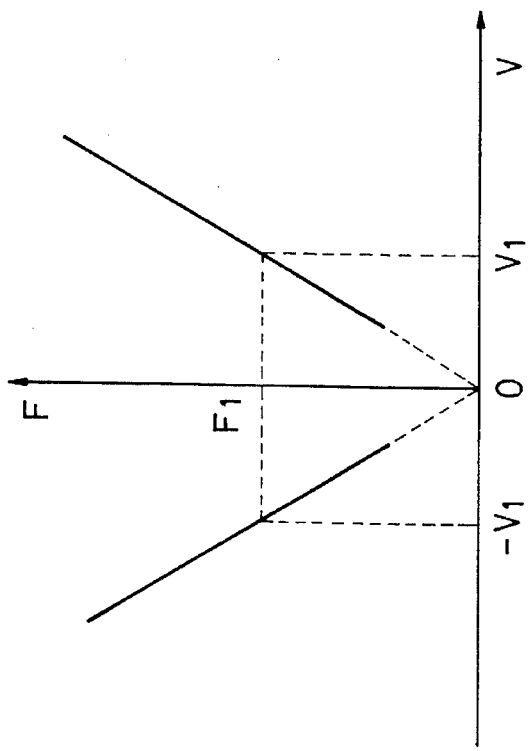
Figure 7:
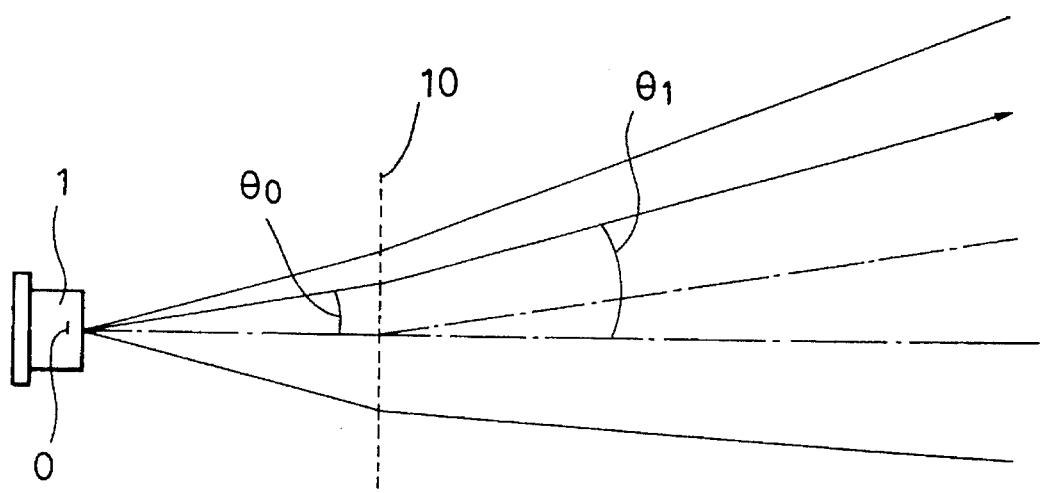
FIG. 7 is an illustration of the diffraction of point light emission.

FIG. 7 is an illustration of the diffraction of point light emission. Reference numeral 1 denotes a laser diode; and reference numeral 10 denotes a diffraction grating having a grating pitch d. When a light beam emitted from a point light source O of the laser diode 1 of a wavelength $\lambda$ is transmitted through the diffraction grating 10, diverged and diffracted light is emitted. The exit angle $\theta_1$ with respect to the incidence angle $\theta_0$ into the diffraction grating of the light beam of the +first-order diffracted light is given by the following equation:

$$d(\sin\theta_1 - \sin\theta_0) = \lambda \tag{8}$$

Figure 8:
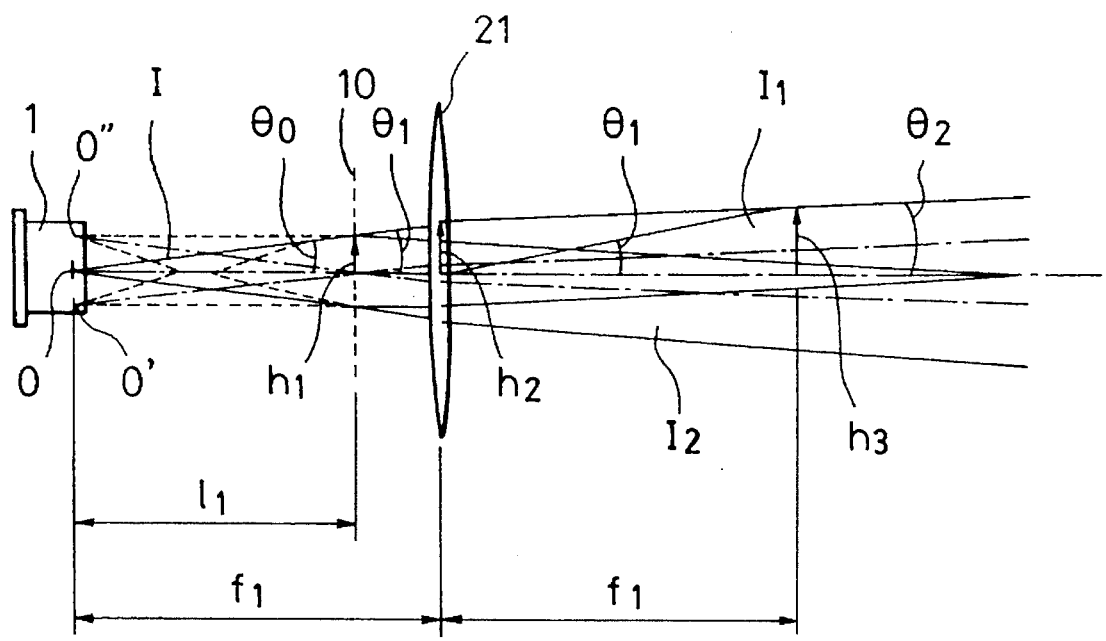
FIG. 8 is a view of principles of the present invention.

FIG. 8 is a view of principles of the present invention. A lens 21 is disposed so that the substantial point light sources O' and O" for the diverged and diffracted light are brought into focal position at a focal length of f1 (i.e., the position at a distance f1 from the point light source O). The light beams I1 and I2 which are transmitted through the lens 21 are formed into collimated light beams. Interference fringes which are not dependent upon the measurement depth are obtained by the light beams I1 and I2.

In this embodiment, when the angle and the height of the light beam are set as shown in FIG. 8, the relations described below are satisfied:

$$h1 = l1\tan\theta_0 \tag{9}$$

$$\sin\theta_1 + \sin\theta_0 = \lambda/d \tag{10}$$

$$h2 = h1 + (f-l1) \times \tan\theta_1 \tag{11}$$

$$h3 = f1\tan\theta_1 \tag{12}$$

$$\tan\theta_2 = (h3-h2)/f1, \text{ with} \tag{13}$$

$\theta_0$: angle of light beam I relative to the optical axis of the optical system in the section between the laser 1 and the diffraction grating 10

$\theta_1$: angle of light beam I relative to the optical axis of the optical system in the section between the diffraction grating 10 and the lens 21

$\theta_2$: angle of light beam I relative to the optical axis of the optical system in the lens 21 or later h1: height of light beam I from the optical axis of the optical system in the diffraction grating 10 h2: height of light beam I from the optical axis of the optical system in the lens 21 h3: height of light beam I from the optical axis of the optical system at a position away by focal distance f1 from the lens 21.

On the other hand, the interval P of the interference fringes formed by the light beams I1 and I2 is:

$$P = \lambda/(2\sin\theta_2) \tag{14}$$

Equations (9) to (14) are calculated as having a paraxial image forming relation ($\sin\theta = \tan\theta = \theta$):

$$P = f1 d/2l1 \tag{15}$$

Thus, there is no item of the laser wavelength $\lambda$, and the optical construction in which the interval P of the interference fringes is not dependent upon the wavelength is realized.

In the conventional example, as described above, when the grating pitch of the diffraction grating 10 is determined, the interval of the interference fringes is determined.

According to the above-described principles, even if the grating pitch is fixed, it is possible to select the interval of the interference fringes by varying the distance 11 from the point light source to the light beam. As a result, the freedom of apparatus design is increased. By providing a means for varying the distance 11, an optical system is realized in which the influence of wavelength variations during measurement is eliminated, and the interval of the interference fringes can be easily set before measurement.

Figure 9:
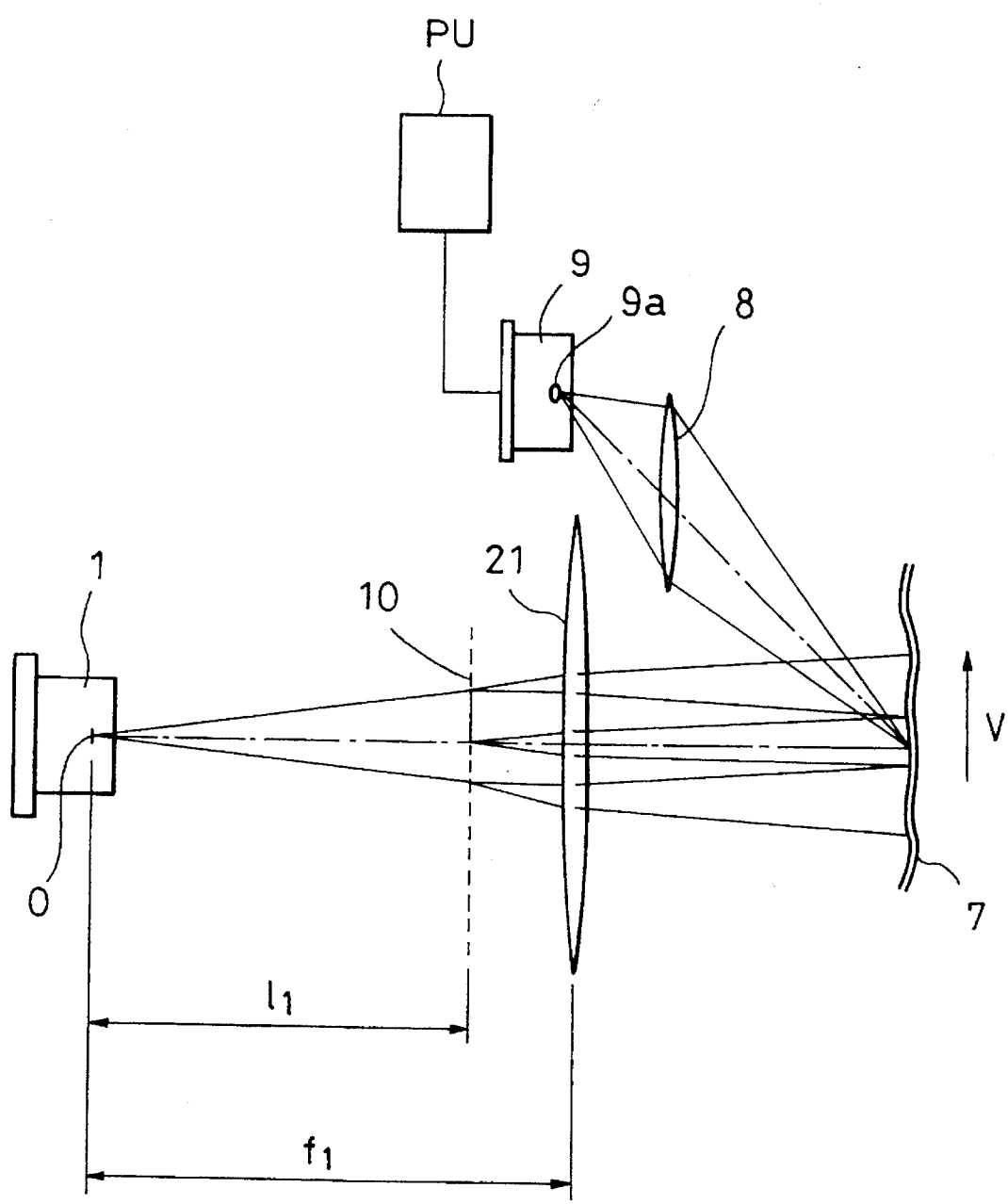
FIG. 9 is an illustration of an apparatus in accordance with a first embodiment of the present invention.

FIG. 9 is an illustration of a speed measuring apparatus in accordance with the first embodiment of the present invention which employs the above-described principles. The components in FIG. 9 which are the same as those described earlier are given the same reference numerals. In this embodiment, in the optical system explained with reference to FIG. 8, the following are set: $l1=16$ mm, $f1=20$ mm, and $d=8$ μm so that the interval P of the interference fringes which is not dependent upon the wavelength is formed. A diode chip is formed on the laser diode 1, which diode chip is formed into the substantial point light source O. ±First-order light generated by the light beam are converted into a collimated light beam by the lens 21, the object 7 to be measured moving at a speed V is placed in the interference fringes formed portion where the two collimated light beams are not separated completely, and the light scattered from the object 7 to be measured is condensed into a photosensitive section 9a of the photodetector 9 through the light-condensing lens 8. When the scattered light is detected by the photodetector 9 in this way, the beat frequency F at the photodetector 9 becomes as follows:

$$F = V/P = 2Vl1/f1d \quad (16)$$
$$= V/5 \text{ (kHz)}$$

Therefore, by detecting the beat frequency F, it is possible to calculate the speed V of the object 7 to be measured. A computing unit PU detects the beat frequency F and calculates the speed V of the object to be measured on the basis of equation (16). The beat frequency F is constant regardless of the variation in wavelength, and thus an apparatus in which the influence of wavelength variation is eliminated is realized. Also, since a collimated light beam is formed by the lens 21, a construction is realized in which the incident light into the light beam is the diverged light from the point light source by the optical system.

Figure 10:
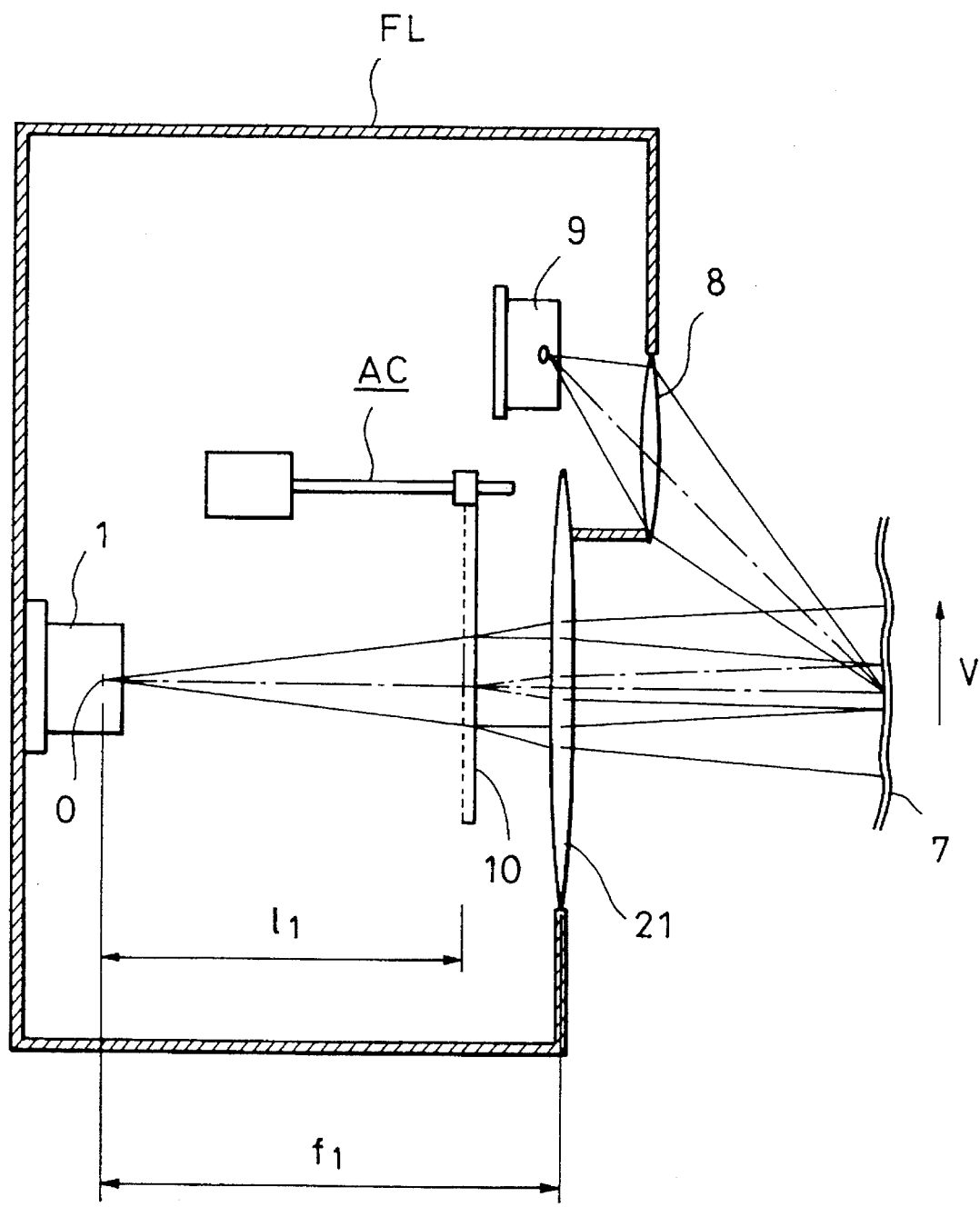
FIG. 10 is an illustration of an apparatus in accordance with a second embodiment of the present invention.

FIG. 10 is an illustration of the portion of an optical system of a second embodiment of the apparatus of FIG. 9 in accordance with the present invention. The construction and the operation of this apparatus are the same as those of the apparatus of FIG. 9. In this modification, the laser diode 1, the lens 21, the light-condensing lens 8, and the photodetector 9 are disposed inside a frame FL in a fixed positional relation. On the other hand, the diffraction grating 10 is capable of being displaced in parallel to the optical axis of the lens 21 within the frame FL by means of an actuator AC controlled by a control apparatus (not shown). This displacement makes it possible to vary the distance 11 from the point light source. The operator is able to vary the position of the diffraction grating 10 (i.e., the value of the distance 11) in accordance with the interval of the interference fringes to be set on the basis of equation (15). In this case, when the operator inputs the interval of the interference fringes to be set by inputting means (not shown), control means may control so that the diffraction grating is moved to a position corresponding to the input value on the basis of equation (15).

Figure 11:
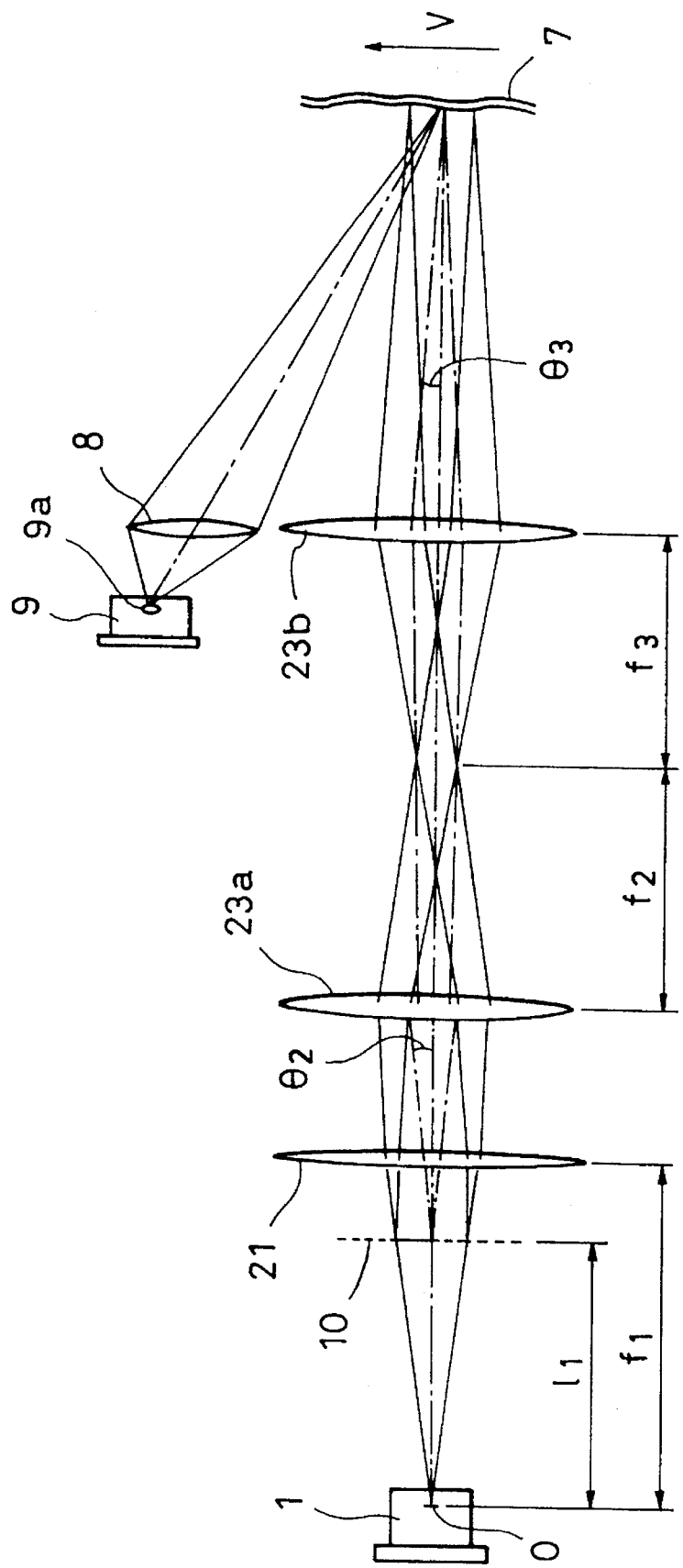
FIG. 11 is an illustration of an apparatus in accordance with a third embodiment of the present invention.

FIG. 11 is an illustration of the construction of an apparatus in accordance with a third embodiment of the present invention. In this apparatus, the two light beams obtained by the optical system shown in FIG. 9 are transmitted once through lenses 23a and 23b which are an afocal optical system. The light scattered from the object 7 to be measured is condensed into the photosensitive section 9a of the photodetector 9 efficiently by the light-condensing lens 8.

If the focal length of the lens 23a is denoted as f2 and the focal length of the lens 23b as f3, the relation between angles θ2 and θ3 becomes as described below:

$$f2\tan\theta2 = f3\tan\theta3 \quad (17)$$

Therefore, the interval P' of the interference fringes, obtained at the angle θ3, becomes as follows in the paraxial image forming relation:

$$P'=f1f3d/2f2l1 \quad (18)$$

Thus, the interference fringes which are not dependent upon the wavelength are formed.

For example, if $f2=f3$, the relation $P'=P$ is satisfied, and the Doppler frequency which is the same as in equation (16) is obtained. In the third embodiment, it is possible to set the intersection position of the two light beams at a position far away from the lens end surface in comparison with the first embodiment, and also the measurement depth is increased.

Although in the above-described embodiment, the point light source is made the diode chip of the laser diode itself, it may also be possible that the light beams from the laser diode is converged by a lens or the like, and the converged point is made the point light source. Also, a pin hole may be provided at this converged point.

Before a fourth embodiment of the present invention is explained, the principles of the fourth embodiment will be explained.

Figure 12:
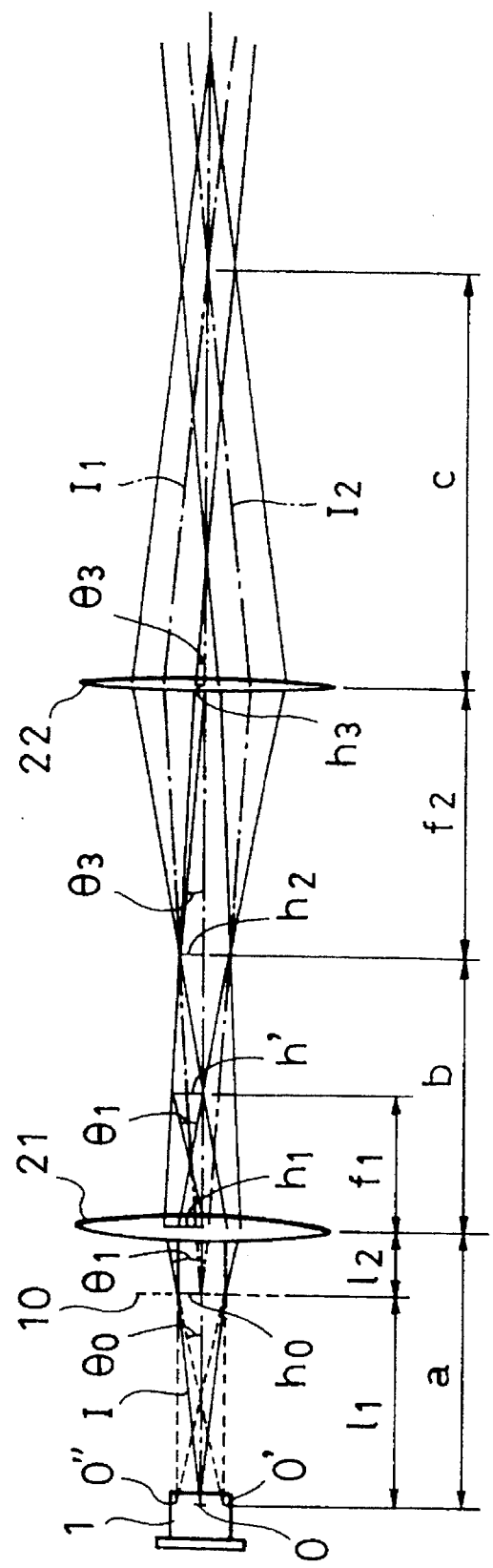
FIG. 12 is an illustration of principles in accordance with a fourth embodiment of the present invention.

FIG. 12 is an illustration of the principles in accordance with the fourth embodiment of the present invention. In this embodiment, the distance from the point light source is not set at f1 in the lens 21 at a focal length of f1, and substantial point light source O' and O" for the diverged and diffracted light are formed into an image at two converged points. A lens 22 is disposed so that the above two converged points become focal positions at a focal length of f2. The light beams I1 and I2 which are transmitted through the lens 22 become collimated light beams. Interference fringes which are not dependent upon the measurement depth are obtained by the light beams I1 and I2.

If the angle and the height of the light beam are set as shown in FIG. 12, the following relations are satisfied:

$$h0=l1\theta0 \quad (19)$$
$$\sin\theta1=\lambda/d+\sin\theta0 \quad (20)$$
$$h1=h0+l2\tan\theta1 \quad (21)$$
$$h'=f1\tan\theta1 \quad (22)$$
$$h2=h1+(h'-h0)\times b/f1 \quad (23)$$
$$h3=h1+(h'-h0)\times(b+f2)/f1 \quad (24)$$
$$\tan\theta3=h2/f2 \quad (25)$$
$$c=f2\times h3/f2 \text{ (assuming } \theta0=0) \quad (26)$$
$$1/a+1/b=1/f1, \text{ with} \quad (27)$$

θ0: angle of light beam I relative to the optical axis of the optical system in the section between laser 1 and the diffraction grating 10

θ1: angle of light beam I relative to the optical axis of the optical system in the section between the diffraction grating 10 and the lens 21

θ3: angle of light beam I relative to the optical axis of the optical system in the lens 22 or later.

θ0: height of light beam I from the optical axis of the optical system in the diffraction grating 10 h1: height of light beam I from the optical axis of the optical system in the lens 21 h': height of light beam I from the optical axis of the optical system at a position away by focal distance f1 from the lens 21 h2: height of light beam I from the optical axis of the optical system at a position away by b from the lens 21 h3: height of light beam I from the optical axis of the optical system in the lens 22.

On the other hand, the interval P of the interference fringes of the light beams I1 and I2 is:

$$P=\lambda/(2\sin\theta2) \qquad (28)$$

Equations (19) to (28) are calculated as having a paraxial image forming relation ($\sin\theta=\tan\theta=\theta$):

$$P=f1f2d/2\{f1l2+b(f1-l2)\} \qquad$$

Thus, there is no item of the laser wavelength $\lambda$, and the optical construction in which the interval P of the interference fringes is not dependent upon the wavelength is realized.

When this embodiment is considered from a different point of view, and when the focal length of the optical system formed of the lenses 21 and 22 is denoted as fA, the principal plane of the optical system on the object side is away by a distance fA from the point light source. By forming the optical system by a combination of a plurality of lenses as described above, the freedom of design for performing aberration correction during apparatus design is further improved.

In this embodiment, even if the grating pitch is fixed, the interval of the interference fringes can be selected by varying the distance l2 from the lens 21 to the diffraction grating or the distance b from the lens 21 to the point light source. This improves the freedom of apparatus design. By providing a means for varying the distance l2 or b, an optical system is realized in which the influence of wavelength variations during measurement is eliminated, and the interval of the interference fringes can be easily set before measurement.

Figure 13:
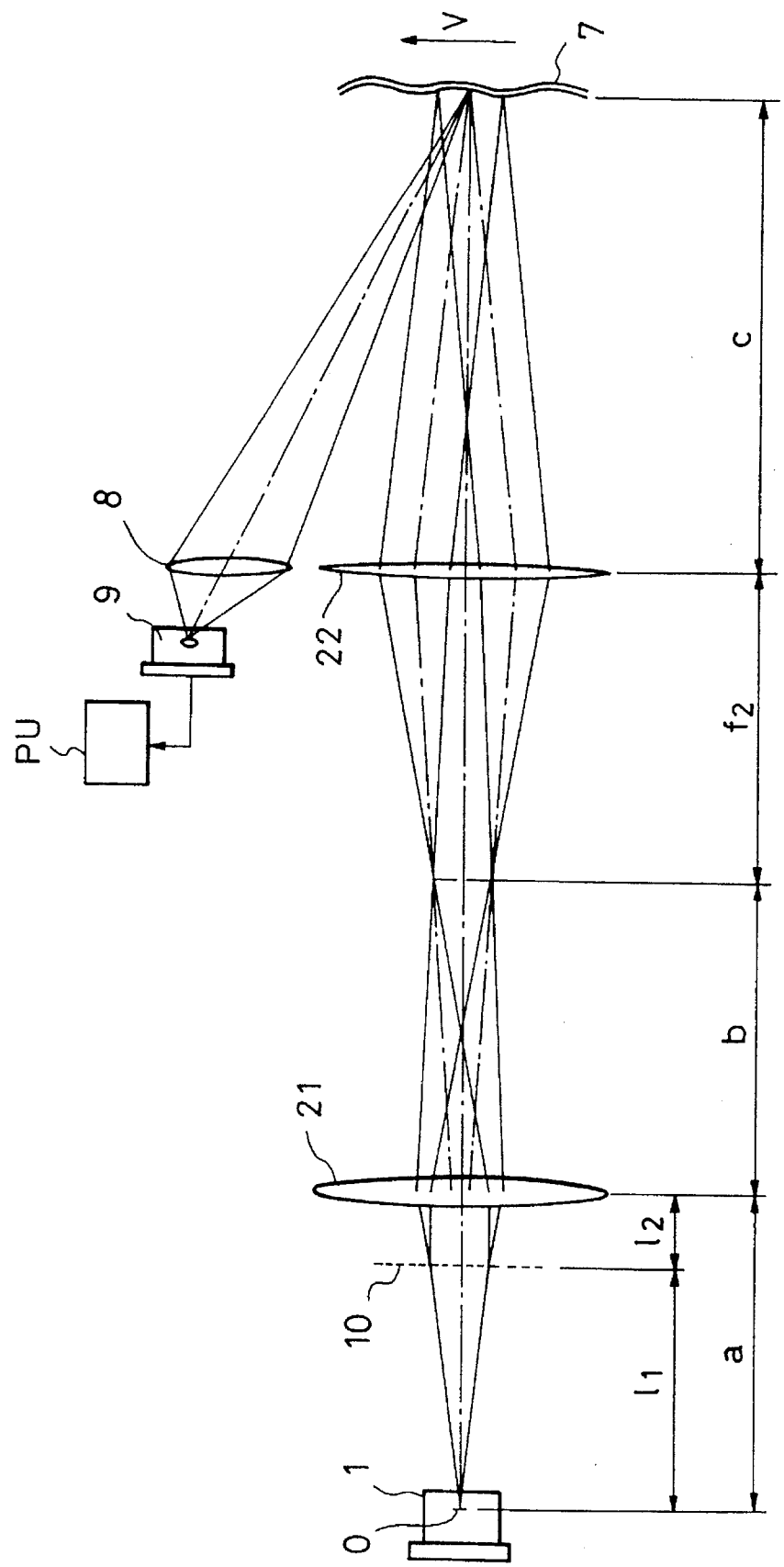
FIG. 13 is an illustration of an apparatus in accordance with the fourth embodiment of the present invention.

FIG. 13 is an illustration of the construction of an apparatus in accordance with a fourth embodiment of the present invention. The components in FIG. 13 which are the same as those described earlier are given the same reference numerals. In this embodiment, in the optical system explained with reference to FIG. 12, the following are set: l1=16 mm, l2=4 mm, f1=10 mm, b=20 mm, f2=20 mm, and d=8 μm so that the interval P of the interference fringes which is not dependent upon the wavelength is formed. At this time, c is 35 mm on the basis of equation (26). A diode chip is formed on the laser diode 1, and this is formed as a substantial point light source O. ±First-order light generated by the diffraction grating are formed into an image by the lens 21, and secondary point light sources are formed respectively, after which the light is converted into a parallel light beam by the lens 22. The object 7 to be measured moving at a speed V is placed in the interference fringes formed portion where the two light beams intersect each other, and the light scattered from the object 7 to be measured is condensed into the photosensitive section 9a of the photodetector 9 through the light-condensing lens 8 disposed offset from the lens 22. The beat frequency F at the photodetector 9 becomes as follows:

$$F = V/P = 2Vl\{f1l2 + b(f1-l2)\}/f1f2d \qquad (30)$$
$$= V/5 \text{ (kHz)}$$

Therefore, by detecting the beat frequency F, it is possible to calculate the speed V of the object 7 to be measured. The computing unit PU detects the beat frequency F and calculates the speed V of the object to be measured on the basis of equation (30).

In this embodiment also, a mechanism for displacing the diffraction grating 10 along the optical axis may be disposed in the same way as in the second embodiment. This mechanism makes it possible to adjust the interval of the interference fringes.

Although in the above-described fourth embodiment, the point light source is formed as the diode chip of the laser diode itself, it may also be possible that the light beam is converged by a lens or the like in the section from the laser diode to the diffraction grating, and the converged point is made the point light source. Also, a pin hole may be provided at this converged point.

Before a fifth and a sixth embodiment of the present invention are explained, the principles of the fifth and sixth embodiments will be explained.

Figure 14:
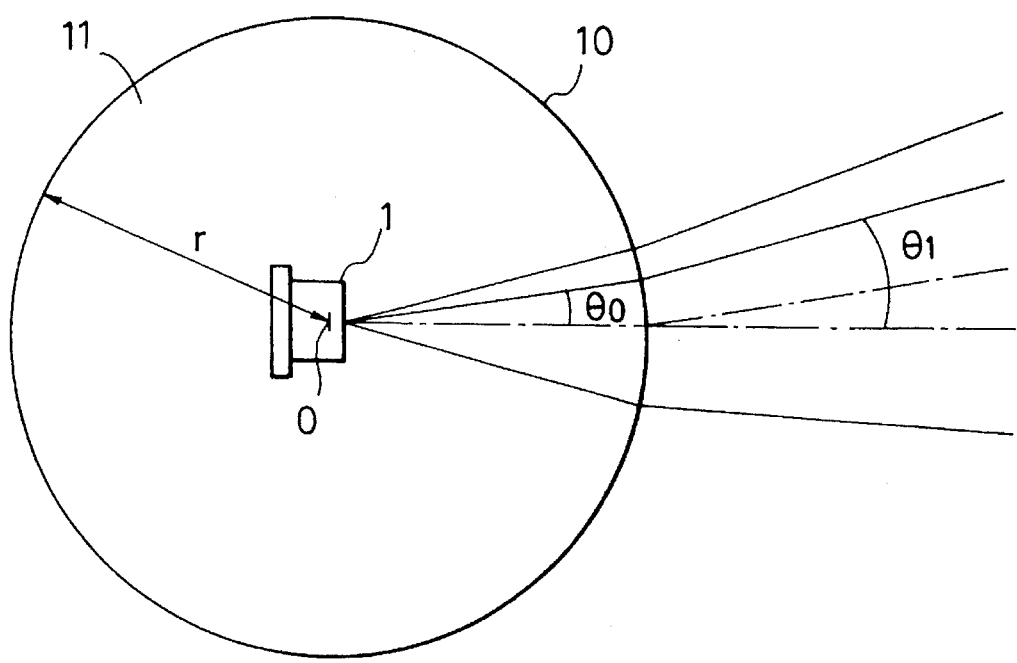
FIG. 14 is an illustration of diffraction by a diffraction grating on a cylinder for point light emission.

FIG. 14 is an illustration of diffraction of a light beam from the point light source disposed in the center of a cylinder. Reference numeral 1 denotes a laser diode, and reference numeral 11 denotes a cylinder having a radius r on which the diffraction grating 10 whose number of gratings is N is disposed. When the light beam emitted from the point light source O of the laser diode 1 having a wavelength $\lambda$ is transmitted through the diffraction grating 10, diverged and diffracted light is emitted. The exit angle θ1 of the light beam of the ±first-order diffracted light relative to the optical axis 80 is given by the following equation:

$$\theta1=\theta'+\theta0 \qquad (31)$$

where $$d\sin\theta'=\lambda, \text{ and } d=2\pi r/N \qquad (32)$$

In the above equation, d corresponds to the grating pitch, which varies in proportion to the change in the radius r of the cylinder 11.

Figure 15:
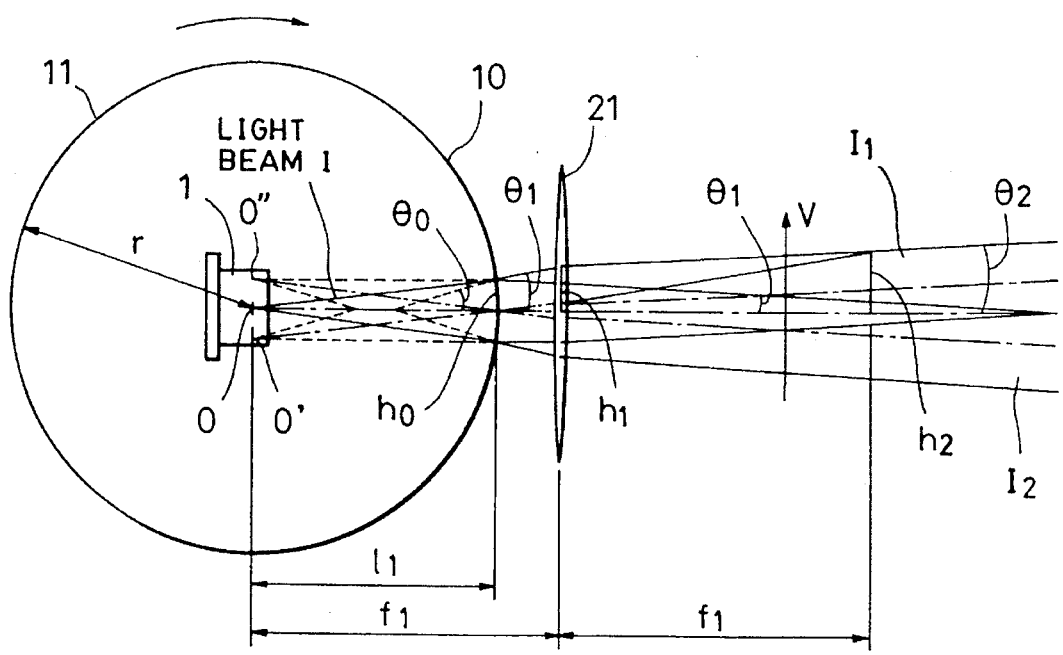
FIG. 15 is an illustration of principles in accordance with a fifth embodiment of the present invention.

FIG. 15 is an illustration of the principles in accordance with a fifth embodiment of the present invention. The lens 21 is disposed so that the substantial point light sources O' and O" for the diverged and diffracted light are brought into a focal position (i.e., a position at a distance f1 from the point light source O') at the focal length f1. The light beams I1 and I2 which are transmitted through the lens 22 become a collimated light beam. Interference fringes which are not dependent upon the measurement depth are obtained by the light beams I1 and I2.

If the angle and the height of the light beam are set as shown in FIG. 15, the following relations are satisfied:

$$h0=r\sin\theta0 \qquad (33)$$
$$l1=r\cos\theta0 \qquad (34)$$
$$\theta1=\theta'+\theta0 \qquad (35)$$
$$2\pi r/N\times\sin\theta'=\lambda \qquad (36)$$

$$h1=h0+(f1-11)\times\tan\theta \quad (37)$$

$$h2=f1\tan\theta1 \quad (38)$$

$$\tan\theta2=(h2-h1)/f1, \text{ with} \quad (39)$$

h0: height of light beam I from the optical axis of the optical system in the cylindrical grating 11 h1: height of light beam I from the optical axis of the optical system in the lens 21 h2: height of light beam I from the optical axis of the optical system at a position away by focal distance f1 from the lens 21

θ0: angle of light beam I relative to the optical axis of the optical system in the section between the laser 1 and the cylindrical grating 11

θ1: angle of light beam I relative to the optical axis of the optical system in the section between the cylindrical grating 11 and the lens 21

θ2: angle of light beam I relative to the optical axis of the optical system in the lens 21 or later.

On the other hand, the interval P of the interference fringes of the light beams I1 and I2 is:

$$P=\lambda/(2\sin\theta2) \quad (40)$$

Equations (33) to (40) are calculated as having a paraxial image forming relation ($\sin\theta=\tan\theta=\theta$, $\cos\theta=1$):

$$P=\pi f1/N \quad (41)$$

Thus, there are no items of the laser wavelength λ and the radius r of the cylinder 11, and an optical construction is realized in which the interval P of the interference fringes is not dependent upon the wavelength and is not dependent upon the change in the radius due to the thermal expansion of the cylinder.

Next, a case in which the cylinder 11 is rotated at a number of rotations fn in the direction of the arrow will be considered. The light beam I1 receives a Doppler shift $\Delta f1 = -Nfn$, and the light beam I2 receives a Doppler shift $\Delta f2 = +Nfn$. The Doppler shift Fg is given as follows:

$$Fg=\Delta f2-\Delta f1=2Nfn \quad (42)$$

When the object to be measured is moved at a speed V in the direction of the arrow in the figure on a two-lightbeams intersection portion, the total Doppler frequency F becomes:

$$\begin{aligned} F &= Fg + V/P \\ &= 2Nfn + NV/\pi f1 \end{aligned} \quad (43)$$

Thus, by monitoring the number of rotations fn of the cylinder 11 in order to detect the Doppler frequency F, the speed can be detected by using equation (43). In this case, since the dependence upon the change in the radius due to the thermal expansion of the cylinder can be eliminated, the above-described problem can be solved.

Figure 16:
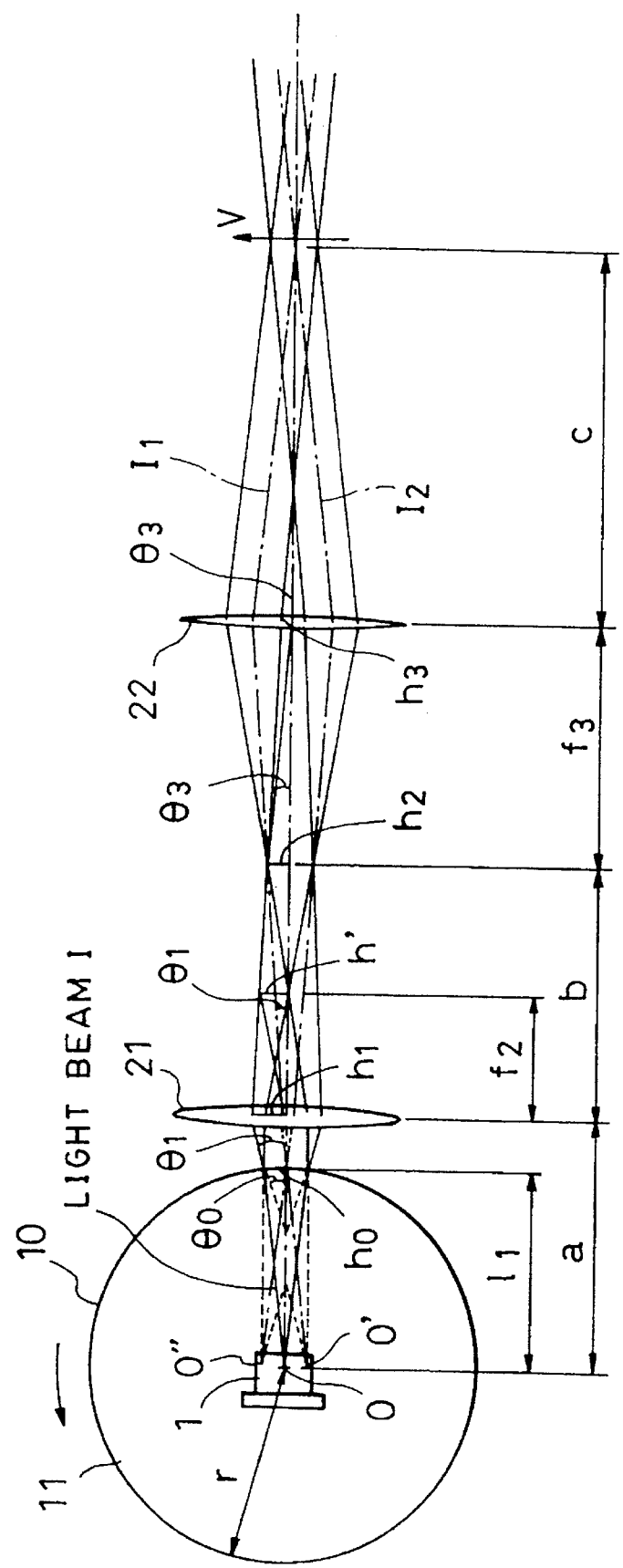
FIG. 16 is an illustration of principles in accordance with a sixth embodiment of the present invention.

FIG. 16 is an illustration of the principles in accordance with a sixth embodiment of the present invention. The lens 21 is disposed so that the substantial point light sources O' and O" for the diverged and diffracted light are formed into an image at two converged points at a focal length of f2. The lens 22 is disposed so that the above two converged points become focal positions at a focal length of f3. The light beams I1 and I2 which are transmitted through the lens 22 become collimated light beams. Interference fringes which are not dependent upon the measurement depth are obtained by the light beams I1 and I2.

If the angle and the height of the light beam are set as shown in FIG. 16, the following relations are satisfied:

$$h0=r\sin\theta0 \quad (44)$$

$$11=r\cos\theta0 \quad (45)$$

$$\theta1=\theta'+\theta0 \quad (46)$$

$$2\pi r/N\times\sin\theta'=\lambda \quad (47)$$

$$h1=h0+(a-11)\times\tan\theta1 \quad (48)$$

$$h'=f2\tan\theta1 \quad (49)$$

$$h2=h1+(h'-h1)\times b/f2 \quad (50)$$

$$h3=h1+(h'-h1)\times(b+f3)/f2 \quad (51)$$

$$\tan\theta3=h2/f3 \quad (52)$$

$$c=f3\times h3/f2 \text{ (assuming v0=0)} \quad (53)$$

$$1/a+1/b=1/f2, \text{ with} \quad (54)$$

h0, h1, h2: same as in FIG. 15 h3: height of light beam I from the optical system in the lens 22

θ0, θ1: same as in FIG. 15

θ3: angle of light beam I relative to the optical axis of the optical system in the lens 23 or later.

On the other hand, the interval P of the interference fringes of the light beams I1 and I2 is:

$$P=\lambda/(2\sin\theta3) \quad (55)$$

Equations (44) to (55) are calculated as having a paraxial image forming relation ($\sin\theta=\tan\theta=\theta$, $\cos\theta=1$):

$$P=\pi f3(a-f2)/f2N \quad (56)$$

Thus, there are no items of the laser wavelength λ and the radius r of the cylinder 11, and an optical construction is realized in which the interval P of the interference fringes is not dependent upon the wavelength and is not dependent upon the change in the radius due to the thermal expansion of the cylinder.

When the cylinder 11 is rotated at a number of rotations fn in the direction of the arrow in the figure, the light beam I1 receives a Doppler shift $\Delta f1=+Nfn$, and the light beam I2 receives a Doppler shift $\Delta f2=-Nfn$. The Doppler shift Fg of the bias between the two light beams is given as follows:

$$Fg=\Delta f1-\Delta f2=2Nfn \quad (57)$$

When the object to be measured is moved at a speed V in the direction of the arrow in the figure on a two-light-beams intersection portion, the total Doppler frequency F becomes:

$$\begin{aligned} F &= Fg + V/P \\ &= 2Nfn + Nf2V/\pi f3(a-f2) \end{aligned} \quad (58)$$

Thus, by monitoring the number of rotations fn of the cylinder 11 by the construction of FIG. 16 in order to detect the Doppler frequency F, the above-described problem can be solved.

Figure 17:
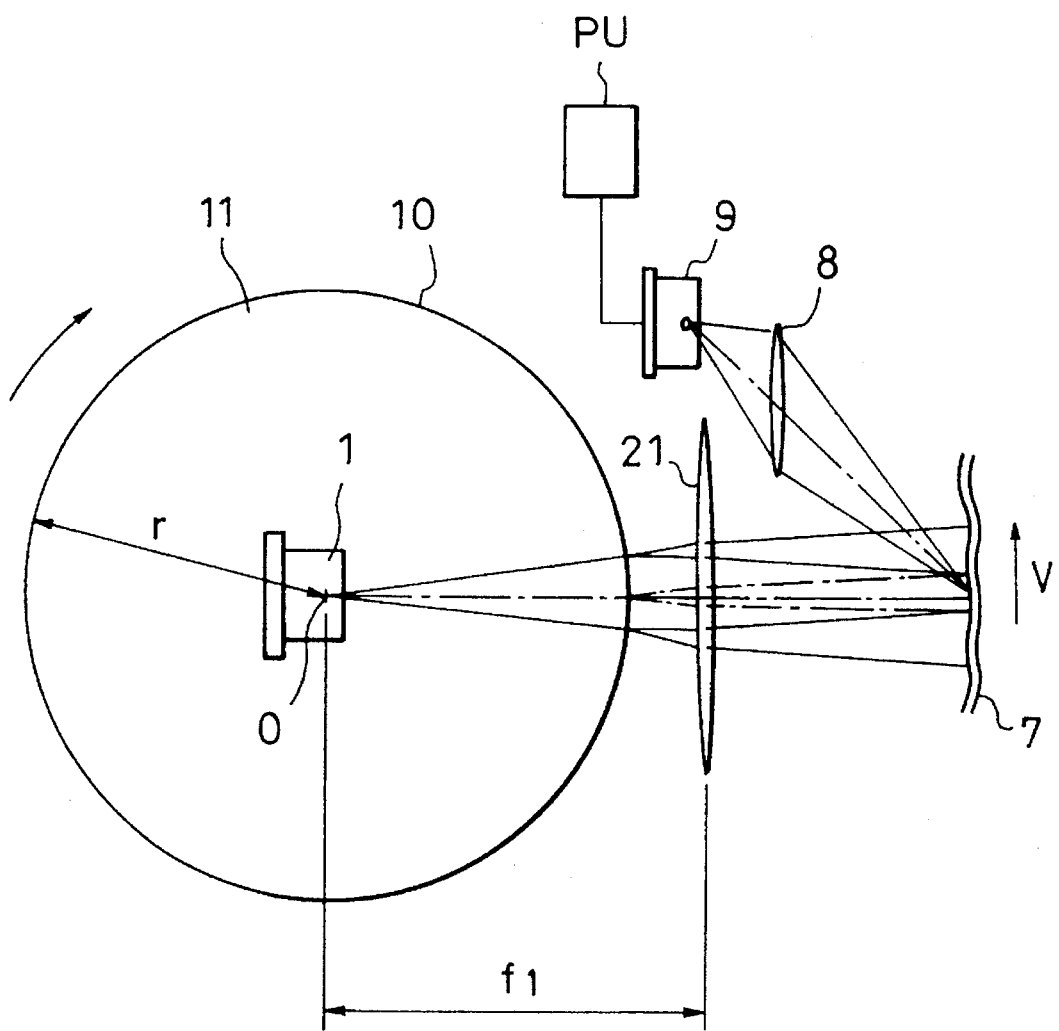
FIG. 17 is an illustration of an apparatus in accordance with the fifth embodiment of the present invention.

FIG. 17 is an illustration of an apparatus in accordance with a fifth embodiment of the present invention. The components in FIG. 17 which are the same as those described earlier are given the same reference numerals. In this embodiment, in the optical system explained with reference to FIG. 15, the following are set: N=7200, r=15 mm (at a temperature 25°), and f1=20 mm, so that the interval P of the interference fringes which is not dependent upon the wavelength is formed. A diode chip is formed on the laser diode 1, and this is formed as the substantial point light source O. The cylinder 11 is rotated in the direction of the arrow by a drive motor (not shown) with the point light source O being as the rotational center, and the number of rotations fn is monitored by an encoder (not shown). The ±first-order light generated by the diffraction grating are converted into collimated light beams by means of the lens 21, the object 7 to be measured moving at a speed V is placed in the interference fringes formed portion of the area where the two light beams are not completely separated, and the light scattered from the object 7 to be measured is condensed into the photosensitive section 9a of the photodetector 9 through the light-condensing lens 8 disposed offset from the lens 21. When the scattered light is detected by the photodetector 9 in this way, the Doppler frequency F at the photodetector 9 becomes as follows on the basis of equation (43):

$$F = 2Nfn + NV/\pi f1 \quad (59)$$
$$= 14400fn + 360V/\pi$$

Thus, the speed V becomes:

$$V=(F-14400fn) \pi/360 \quad (60)$$

The speed is calculated in real time by the computer PU on the basis of the Doppler frequency F and the number of rotations fn by using equation (60). In this embodiment, in addition to the advantage that the influence of the above-described thermal expansion can be eliminated, there is the advantage that the apparatus is made compact even more since the vacant space inside the cylinder can be utilized effectively because a point light source is disposed within the cylinder.

Figure 18:
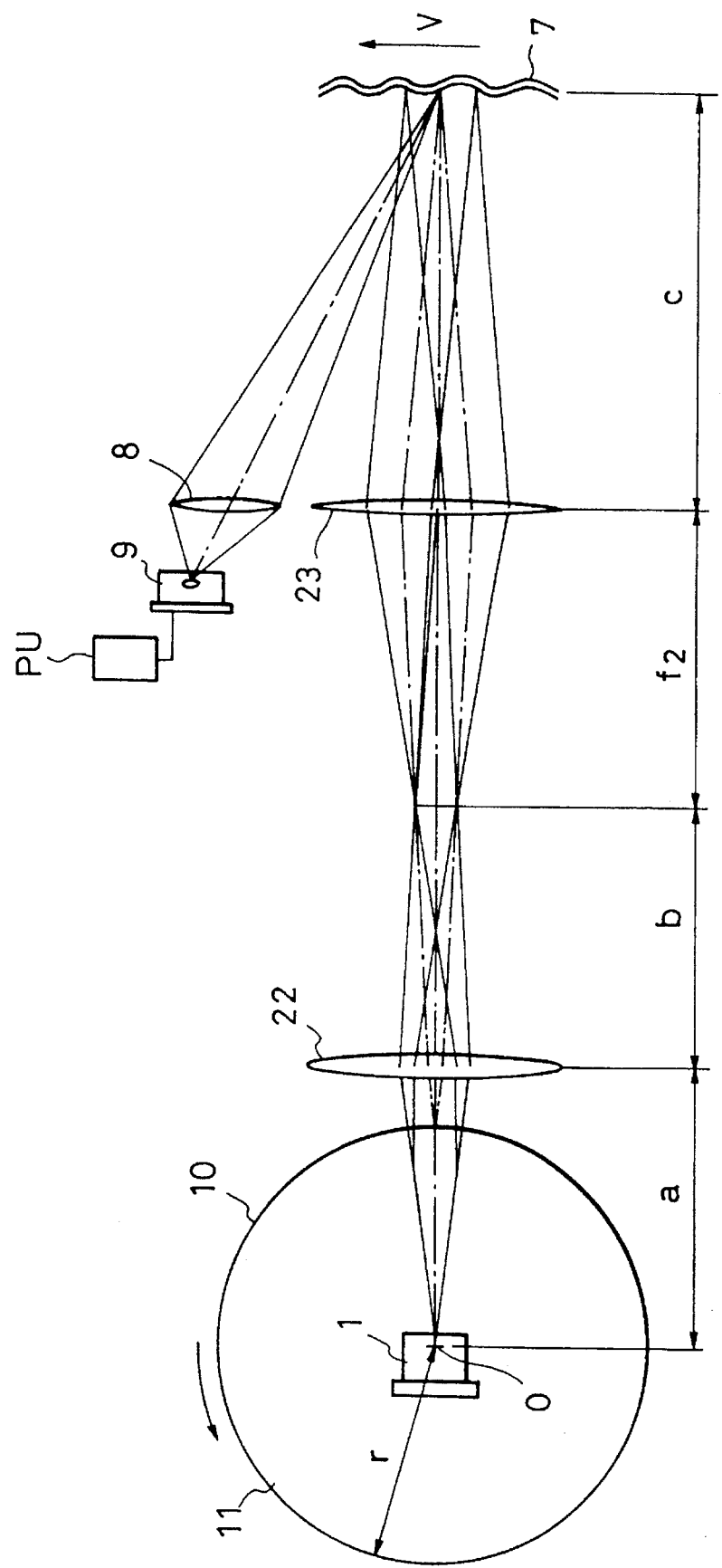
FIG. 18 is an illustration of an apparatus in accordance with the sixth embodiment of the present invention

FIG. 18 is an illustration of an apparatus in accordance with a sixth embodiment of the present invention. In the optical system explained with reference to FIG. 16, the following are set: N=7200, r=15 mm (at a temperature 25°), a=20 mm, f2=10 mm, b=20 mm, and f3=20 mm, so that the interval P of the interference fringes which is not dependent upon the wavelength and is not dependent upon the variation in the radius of the cylinder 11 is formed. At this time, c is 35 mm on the basis of equation (30). The cylinder 11 is rotated in the direction of the arrow by a drive motor (not shown) with the point light source O being as the rotational center, and the number of rotations fn is monitored by an encoder (not shown). The object 7 to be measured moving at a speed V in the direction of the arrow is placed in the two-light-beams intersection portion, and the light scattered from the object 7 to be measured is detected by the photodetector 9 through the light-condensing lens 8. The beat frequency F at the photodetector 9 becomes as follows on the basis of equation (58):

$$F = 2Nfn + Nf2V/\pi f3(a-f2) \quad (61)$$
$$= 14400fn + 360V/\pi$$

Therefore, the speed V becomes as follows:

$$V=(F-14400fn) \pi/360 \quad (62)$$

The speed is calculated in real time by the computer PU on the basis of the Doppler frequency F and the number of rotations fn by using equation (62).

When this embodiment is considered from a different point of view, and when the focal length of the optical system formed of the lenses 21 and 22 is denoted as fA, the principal plane of the optical system on the object side is away by a distance fA from the point light source.

Although in the fifth and sixth embodiments the laser diode chip is formed as a point light source, the same advantage as in the embodiments can be obtained even if, for example, the light beam of the laser diode is converged by a lens and the converged point is replaced with a point light source. A pin hole or the like may be provided at the convergence position.

In the above-described fifth and sixth embodiments, a case in which an encoder is disposed as a means for detecting the number of rotations is described. If a part of two diffracted lights from the diffraction grating 10 are separated from the light path toward the object by means of a half mirror, and if these lights are superimposed on each other and detected as coherent light by means of a photodetector, the Doppler shift Fg shown in equation (42) or (57) is obtained as the beat frequency. The Doppler shift Fg is proportional to the number of rotations fn. In both FIGS. 17 and 18, equations (60) and (62) are given as follows:

$$V=(F-Fg) \pi/360 \quad (63)$$

The speed V may be calculated on the basis of the Doppler frequency F and the Doppler shift Fg in real time by the computer PU.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the claims. The following claims are to be accorded the broadest interpretation, so as to encompass all such modifications, equivalent structures and functions.

What is claimed is:

1. A speed measuring apparatus, comprising:

a light source unit for generating a diverged light beam;

a diffraction grating for generating exit light, having at least two exit light beams and including diffracted light, when the diverged light beam from said light source unit enters said diffraction grating;

optical means for converting the exit light into a collimated light; and optical detecting means for receiving interference light formed by projecting the collimated light on an object to be measured, wherein the speed of the object is measured by using signals obtained by said optical detecting means.

2. A speed measuring apparatus according to claim 1, wherein said light source unit has a point light source, and said optical means has a lens system disposed in such a way that said point light source comes substantially to a focal position.

3. A speed measuring apparatus according to claim 2, wherein said optical detecting means receives interference light formed by using scattered light from an area of the object to be measured where the two exit light beams which are converted into collimated light are not completely separated.

4. A speed measuring apparatus according to claim 2, further comprising an afocal optical system for making the two exit light beams which are converted into collimated light by said optical means intersect each other.

5. A speed measuring apparatus according to claim 2, further comprising a first lens for condensing the exit light once, and a second lens for converting the condensed light beam into a collimated light beam.

6. A speed measuring apparatus according to claim 2, wherein said diffraction grating is disposed in a cylindrical form with the position of said point light source being substantially at a center of said diffraction grating.

7. A speed measuring apparatus according to claim 6, further comprising rotation drive means for rotating said diffraction grating.

8. A speed measuring apparatus according to claim 6, wherein said optical detecting means receives interference light formed by using the diverged light from an area of the object to be measured where the two exit light beams which are converted into collimated light are not completely separated.

9. A speed measuring apparatus according to claim 6, wherein said optical means has a plurality of lenses disposed such that said point light source comes into substantially a combined focal position.

10. A speed measuring apparatus according to claim 1, further comprising displacing means for varying the distance between said diffraction grating and said light source unit.

11. An optical apparatus for projecting a light beam onto an object to be measured and for obtaining interference light to be detected from the position at which the light beam is projected, said apparatus comprising:

a light source unit for generating a diverged light beam;

a diffraction grating for generating exit light, having at least two exit light beams and including diffracted light, when the diverged light beam from said light source unit enters said diffraction grating;

optical means for converting the exit light into a collimated light; and optical detecting means for receiving interference light formed by projecting the collimated light onto the object to be measured.

12. An optical apparatus according to claim 11, wherein said light source unit has a point light source, and said optical means has a lens system disposed such that said point light source comes substantially to a focal position.

13. An optical apparatus according to claim 12, wherein said optical detecting means receives interference light formed by using scattered light from an area of the object to be measured where the two exit light beams which are converted into collimated light by said optical means are not completely separated.

14. An optical apparatus according to claim 12, further comprising an afocal optical system for making the two exit light beams which are converted into collimated light by said optical means intersect each other.

15. An optical apparatus according to claim 12, further comprising a first lens for condensing the exit light once, and a second lens for converting the condensed light beam into a collimated light beam.

16. An optical apparatus according to claim 12, wherein said diffraction grating is disposed in a cylindrical form with the position of said point light source being substantially at a center of said diffraction grating.

17. An optical apparatus according to claim 11, further comprising displacing means for varying the distance between said diffraction grating and said light source unit.

18. An optical apparatus for forming interference fringes, comprising:

a light source unit for generating a diverged light beam;

a diffraction grating for generating exit light having at least two exit light beams when the diverged light beam from said light source unit enters said diffraction grating; and optical means for converting the exit light into a collimated light, with interference fringes being formed by the intersection of the exit light beams which are made into a collimated light beam by said optical means.

19. An optical apparatus according to claim 18, further comprising displacing means for varying the distance between said diffraction grating and said light source unit.

20. An optical apparatus according to claim 18, wherein said diffraction grating is disposed in a cylindrical form with the position of said point light source being substantially at a center of said diffraction grating.

21. An optical apparatus according to claim 20, further comprising rotation drive means for rotating said diffraction grating.

* * * * *

UNITED STATES PATENT AND TRADEMARK OFFICE
CERTIFICATE OF CORRECTION

PATENT NO. : 5,557,407
DATED : September 17, 1996
INVENTOR(S) : Takamiya et al.

It is certified that error appears in the above-indentified patent and that said Letters Patent is hereby corrected as shown below:

ON THE TITLE PAGE:

[56] REFERENCES CITED:

FOREIGN PATENT DOCUMENTS, "2262064 10/1990 Japan
3235060 10/1991 Japan" should read --2-262064 10/1990 Japan
3-235060 10/1991 Japan--.

COLUMN 1:

Line 46, "$F=2\Delta f=2V\sin\theta$ (2)" should read --$F=2\Delta f=2V\sin\theta/\lambda$ (2)--.

COLUMN 2:

Line 54, "X" should read --$\lambda$--.

COLUMN 3:

Line 33, "$\sin\theta 0=nX/d$ (5)" should read --$\sin\theta 0=n\lambda/d$ (5)--.

COLUMN 6:

Line 30, "$h2=h1+(f-11)\times\tan\theta 1$ (11)" should read --$h2=h1+(f1-l1)\times\tan\theta 1$ (11)--.

UNITED STATES PATENT AND TRADEMARK OFFICE
CERTIFICATE OF CORRECTION

PATENT NO. : 5,557,407
DATED : September 17, 1996
INVENTOR(S) : Takamiya et al.

It is certified that error appears in the above-indentified patent and that said Letters Patent is hereby corrected as shown below:

<u>COLUMN 9</u>:

Line 6, "$\theta 0$:" should read --$h0$--.

<u>COLUMN 10</u>:

Line 39, "axis 80" should read --axis $\theta 0$--.

<u>COLUMN 12</u>:

Line 18, "c=f3xh3/f2 (assuming v0=0)    (53)"
   should read --c=f3xh3/f2 (assuming $\theta 0$=0)    (53)--.

Signed and Sealed this

Eighteenth Day of March, 1997

*Attest:*

BRUCE LEHMAN

*Attesting Officer*   *Commissioner of Patents and Trademarks*